(12) United States Patent
Garg et al.

(10) Patent No.: US 9,148,854 B2
(45) Date of Patent: Sep. 29, 2015

(54) METHOD AND SYSTEM FOR ADAPTIVE ENHANCED POWER SAVING FOR PEER TO PEER GROUP OWNER

(75) Inventors: Neeraj Kumar Garg, Bangalore (IN); Jithu Jance, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 367 days.

(21) Appl. No.: 13/559,876

(22) Filed: Jul. 27, 2012

(65) Prior Publication Data

US 2014/0032951 A1   Jan. 30, 2014

(51) Int. Cl.
*G06F 1/32* (2006.01)
*H04W 52/02* (2009.01)

(52) U.S. Cl.
CPC ...... *H04W 52/0216* (2013.01); *H04W 52/0219* (2013.01); *Y02B 60/50* (2013.01)

(58) Field of Classification Search
CPC ............... H04W 52/0206; H04W 52/0216; H04W 52/0219; G06F 1/3209
See application file for complete search history.

(56) References Cited

U.S. PATENT DOCUMENTS

| 5,799,256 | A | 8/1998 | Pombo et al. ................. 455/574 |
| 6,311,081 | B1 | 10/2001 | Northcutt et al. ............. 455/574 |
| 8,391,260 | B1 * | 3/2013 | Kopikare et al. ............. 370/338 |
| 8,458,504 | B2 * | 6/2013 | Kangude et al. ............. 370/311 |
| 8,717,959 | B2 * | 5/2014 | Vedantham et al. .......... 370/311 |
| 2011/0286375 | A1 | 11/2011 | Chu et al. ..................... 370/311 |
| 2012/0178429 | A1 * | 7/2012 | Camps Mur et al. ......... 455/418 |
| 2013/0238919 | A1 * | 9/2013 | Ponmudi et al. .............. 713/323 |

FOREIGN PATENT DOCUMENTS

WO   WO 2012/000522 A1   1/2012 ........... H04W 52/02

OTHER PUBLICATIONS

WiGig White Paper: Defining the Future of Multi-Gigabit Wireless Communications, Jul. 2010, 5 pages.
Wi-Fi Certified Wi-Fi Direct™, Personal, portable WiFi® Technology, Wi-Fi Alliance, Oct. 2010, 14 pages.

* cited by examiner

*Primary Examiner* — Albert Wang
(74) *Attorney, Agent, or Firm* — Brinks Gilson & Lione

(57) ABSTRACT

A method and system for saving power in a peer-to-peer group owner. The group owner uses an adaptive absence method for deciding the absence of the group owner based on the amount of data traffic in the network. The group owner periodically sends period of absence information with dynamic values to client devices, informing them of the dynamically changing period of absence.

20 Claims, 8 Drawing Sheets

METHOD AND SYSTEM FOR ADAPTIVE ENHANCED POWER SAVING FOR PEER TO PEER GROUP OWNER

TECHNICAL FIELD

This disclosure relates generally to telecommunication devices. More particularly, this disclosure relates to a method and system for adaptive-enhanced power savings for peer-to-peer group owners in a telecommunication system.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at nearly 80% of the world's population. Furthermore, other estimates indicate that (as just three examples) the United States, Italy, and the UK have more mobile phones in use in each country than there are people living in those countries.

For mobile communication devices, power management is an important consideration. Mobility and portability require that such devices be battery powered. User convenience requires that battery life be very long. This in turn requires that current drain from the battery be minimized to maximize the time before battery recharge is required. Accordingly, there is a need for improved power management in mobile communication devices.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
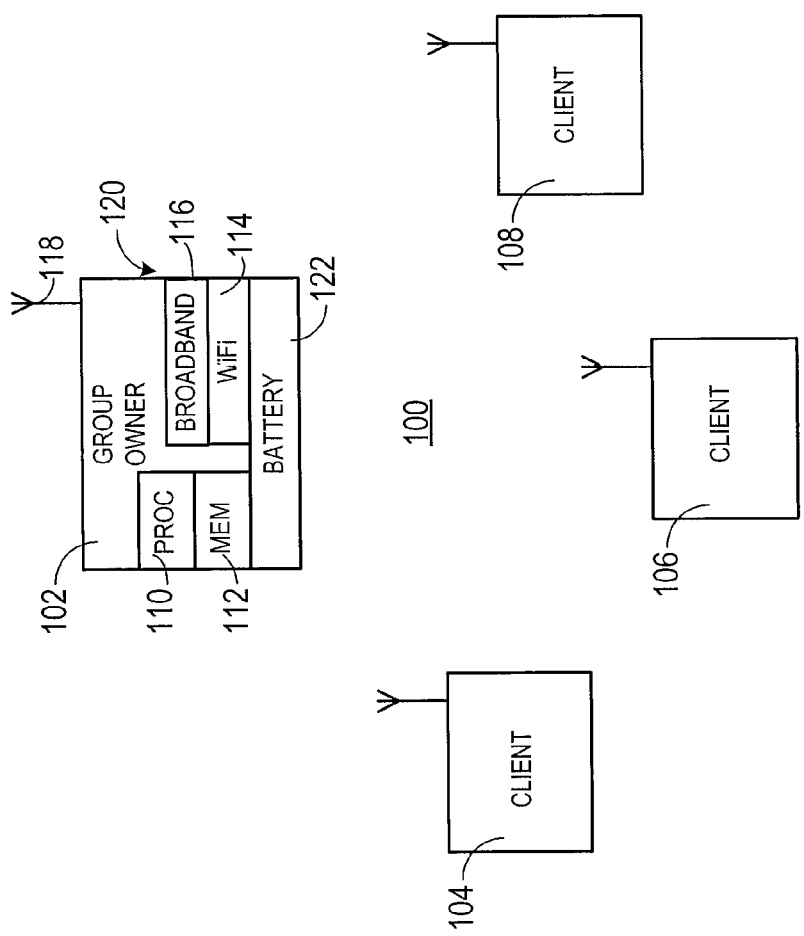
FIG. 1 shows an example of a local communication network.

Mobile telecommunications systems generally make provision for a low power operating mode by mobile devices operating in a system. For example, a mobile device may be permitted to enter a low power operating mode at a time when the mobile device is not active. In the low power mode, the mobile device can reduce power consumption by deactivating unneeded circuitry, such as a user interface, a radio receiver and a radio amplifier. By carefully timing the lower power mode, the mobile device can reduce its power consumption, extend battery life and still be responsive to user requirements and communication with other devices. The timing of entry and exit from the lower power operating mode may be based on system timing or particular timing assigned to the particular mobile device.

One example of a mobile communication system is the system defined by a specification referred to as WiFi Direct. WiFi Direct is a telecommunication standard that allows WiFi devices to wirelessly connect to each other without the need for a wireless access point. In a WiFi Direct network, one device of a group of devices acts as the access point for the other devices in the group.

A conventional WiFi network operates according to one or more versions of the IEEE 802.11 standard published by the Institute of Electrical and Electronics Engineers, Inc. (IEEE). A conventional WiFi network relies on network control by an access point which provides physical support for wireless and wired networking, bridging and routing between devices on the network, and service provisioning to add and remove devices from the network. A single access point can support a network with many devices. The devices on the network may be mobile, such as cellular telephones, tablet computers and laptop computers, or fixed such as printers, desktop computers and the access point itself. The access point further provides data communication to a broadband network through a device such as a set top box, cable modem or other device. In such a conventional network, the access point acts as a central hub to which WiFi capable devices on the network are wirelessly connected. The network devices do not communicate directly, but communicate indirectly through the access point. The access point is powered directly from a reliable power source and is not battery powered.

In contrast to a conventional WiFi network, WiFi Direct devices are able to communicate with each other without requiring fixed wireless access point. The WiFi Direct devices negotiate when they first connect to determine which device acts as an access point to form an ad hoc network. The selected device is then referred to as a WiFi Direct host or group owner. The group owner subsequently operates as a software access point for the local communication network. When another device enters the radio communication range of the WiFi Direct host or group owner, the new device can connect to the host using an existing ad-hoc protocol, and then gather setup information. The new device can seamlessly join the local communication network under control of the group owner or host.

For power management, the WiFi Direct specification provides an absence mode to reduce power consumption. A device may communicate a notice of absence specifying a time of absence or periodic absences when the device will be absent from the network and other devices may not communicate with it. This provides the ability to reduce power consumption in a device by in effect going off line for a time or periodically.

However, the notice of absence feature leaves the device unable to respond to varying communication demands in the network. At some times, data throughput in the network is relatively light and absence of the group owner does not affect network performance. At other times, however, which may not be predictable, data throughput can become quite heavy, as when a device on the network begins streaming data such as video data from a remote network such as the internet or other data source. A device that is not absent from the network, such as a conventional access point with unlimited operating power can remain active and responsive to the variation in throughput.

However, a battery powered device that has periodic absences has heretofore had no way to respond to the variation. While the device may successfully limit power consumption from the battery, this is done at the expense of limited and inflexible response to changes in data throughput. A large file or streaming data may not be communicated effectively and may negatively impact a user's experience. Accordingly, there is a need for a better balance between data throughput and power savings from a battery in a communication device.

Referring now to the drawing, FIG. 1 shows an example of a local communication network 100. The network 100 includes a host or group owner 102 and a plurality of client devices, including client device 104, client device 106, client device 108. Any number of client devices may operate on the communication network 100. The illustration of FIG. 1 is intended to be exemplary only.

The group owner 102 in the illustrated embodiment is a mobile device such as a mobile telephone, a smart phone, a laptop computer, a desktop computer or other data processing device with radio communication. The group owner 102 includes a processor 110, memory 112, radio circuits including a WiFi radio circuit 114, a broadband radio circuit 116 and one or more antennas 116 for radio communication with remote radios. In some embodiments, the radio circuits are contained in a dongle 120 which is physically separate from other components of the group owner 102. The group owner is powered by a battery 122.

The processor 110 operates to control operation of the group owner 102. The processor may be any suitable data processing device such as a microprocessor or preprogrammed logic. Further, the processor may be implemented with any combination of hardware, software and firmware. The processor 110 operates in response to data and instructions stored in memory 112. The memory 112 may include read-only memory and read-write memory. The memory 112 stores instructions and data used by the processor 110 for controlling the group owner 102.

The WiFi radio circuit 114 includes hardware and software necessary to implement radio communications with local radio devices such as the client devices 104, 106, 108. In the exemplary embodiment, the WiFi radio circuit implements a WiFi radio according to an 802.11 standard published by the Institute of Electrical and Electronics Engineers, or any variant of such a standard. In particular, the variant referred to as WiFi Direct is implemented in one example. However, it is to be understood that the description herein is intended to apply to other example radio circuits and systems and technologies, as well. WiFi in general and WiFi Direct are described in this particular example for ease of illustration.

The WiFi radio circuit 114 includes components such as a transmitter, receiver, modulator and oscillator for generating the necessary radio signals for transmission by the group owner and for reception of radio signals by the group owner. Further, the WiFi radio circuit 114 in a typical embodiment includes a processor and memory for controlling operation of the WiFi radio circuit 114. Still further, the WiFi radio circuit 114 includes an interface for exchanging data and signals with other portions of the group owner such as the processor 110 and memory 112.

The broadband radio circuit 116 provides radio communication for the group owner 102 with a broadband radio network. Examples of such broadband radio networks include cellular networks including Global System for Mobile communications (GSM) networks, code division multiple access (CDMA) networks and so-called third generation (3G) and fourth-generation (4G) networks. The broadband radio circuit 116 can initiate radio communication with a remote radio such as a base station of the broadband radio network when the group owner is in a coverage area served by the base station. For mobile communications, radio links can be handed off by the broadband radio circuit 116 among multiple base stations of the broadband radio network.

The broadband radio circuit 116 generally includes components such as a transmitter, receiver, modulator and oscillator for generating the necessary radio signals for transmission by the group owner and for reception of radio signals by the group owner. Further, the broadband radio circuit 116 in a typical embodiment includes a processor and memory for controlling operation of the broadband radio circuit 116. Still further, the broadband radio circuit 116 includes an interface for exchanging data and signals with other portions of the group owner such as the processor 110 and memory 112.

In some embodiments, the dongle 120 contains selected portions of the group owner 102. For example, in the illustrated embodiment, the dongle 120 includes the WiFi radio circuit 114 and the broadband radio circuit 116, along with supporting circuitry. In other embodiments, the dongle 120 may include other components such as a Bluetooth radio circuit or other radio circuits that operate according to different radio standards, known now or developed later. The dongle 120 may be on a separate integrated circuit from the integrated circuit that includes the processor 110, for example. Alternatively, the dongle 120 may be physically removable from the group owner 102.

The client devices 104, 106, 108 are configured for radio communication with the group owner 102. The client devices 104, 106, 108 may be any suitable communication devices or data processing devices capable of radio communication in a network with the group owner 102. For example, the client devices 104, 106, 108 may be embodied as cellular telephones, wireless telephones, smart phones, computers such as tablets and laptops equipped with a suitable radio circuit. The client devices 104, 106, 108 further generally include a processing system and memory for storing data and instructions to control the processor.

In the illustrated example, the client devices 104, 106, 108 each includes radio circuits which permit them to communicate by radio with the group owner and with other similarly equipped devices. In one specific example, the group owner 102 and the client devices 104, 106, 108 each includes a WiFi radio circuit which enables two-way radio communication with other devices using the IEEE 802.11 standard or a variant thereof. Even more specifically, in one example, the group owner 102 and the client devices 104, 106, 108 each operate according to the WiFi Direct standard. The WiFi Direct standard permits two or more radio devices to establish an ad hoc network in which one of them is selected as the host or group owner. The group owner then operates in a manner similar to an access point in a conventional WiFi network or other 802.11 system. The WiFi Direct standard allows the network 100 to be established without the presence of a conventional access point. The network 100 is a peer-to-peer network, in that all devices can act as client or server in the network. One of the peer-to-peer devices is selected as the group owner.

In the illustrated example of FIG. 1, the group owner 102 operates as group owner for the local communication network 100. Each of the client devices 104, 106, 108 is established as a client to the group owner 102. The group owner is responsible for operating as a software access point for the local communication network 100. When another device enters the radio communication range of the WiFi Direct group owner 102, the new device connects to the group owner 102 using an existing ad-hoc protocol, and then gathers setup information. The new device becomes a client of the group owner 102.

Moreover, the group owner 102 can provide broadband access to the broadband network for the client devices 104, 106, 108. The group owner 102 communicates with respective client devices 104, 106, 108 using the WiFi Direct network of local communication network 100. The group owner 102 further communicates with the broadband network using the broadband radio circuit 116. In this manner, the group owner 102 is an interface between the broadband network and the client devices 104, 106, 108. The WiFi radio circuit 114 can collect data from client devices 104, 106, 108 intended for the broadband network. In turn, the broadband radio circuit 114 can communicate the collected data to the broadband network. The reverse channel works similarly, in that the broadband network conveys to the group owner 102 data intended for client devices 104, 106, 108, and the group owner 102 uses the WiFi radio circuit 114 to communicate data to respective client devices 104, 106, 108. The group owner operates as an access point in this configuration.

Operation as an access point in this manner can rapidly deplete the battery 122 of the group owner. Radio communication can be relatively high power and the group owner 102 can become quite busy handing data between the client devices 104, 106, 108 and between respective client devices 104, 106, 108 and the broadband network. As the number of client devices in the network 100 increases, battery depletion can occur even faster.

The WiFi Direct standard provides a period of absence during which a group owner can enter a low power state. The group owner announces the period of absence by broadcasting a beacon to all client devices in the network. During the period of absence, no client device may communicate to the group owner, which is essentially absent from the network, possibly in a low power mode. Low power mode includes powering down circuitry such as radio circuits, processors, and other devices that consume power, to the fullest extent possible. A supervisory function may remain, to monitor timing and ensure that the group owner exits the low power mode at the necessary time. The period of absence may be a single time period or may be periodic.

The conventional period of absence fails to account for variation in data throughput in the network 100, though. Data throughput may refer to the amount of data per unit of time being communicated in the network. For example, data throughput at the group owner 102 may be 50 megabits per second. Data throughput may also refer to the total amount of data receive over a fixed period, such as 1000 packets received at the group owner between beacon intervals. Beacon timing is fixed by the standard and system timing. However, the data throughput is not fixed and may vary.

The network 100 may experience periods of low throughput, such as when the client devices are generally idle and not requesting and receiving much data. At other times, the network 100 may experience periods of moderate throughput, such as when a client device is intermittently transmitting frames of data. At still other times, the network 100 may experience periods of very high throughput, such as when one or more of the client devices transmits or receives streaming data such as a video or audio file. The duration of the streaming data may be seconds or minutes or even hours. If the group owner is entering periodic periods of absence, the streaming of data will be choppy and discontinuous. In the case of video or audio, the discontinuities may be so extreme as to affect the consumption of the streamed data by a user of a client device.

Figure 2:
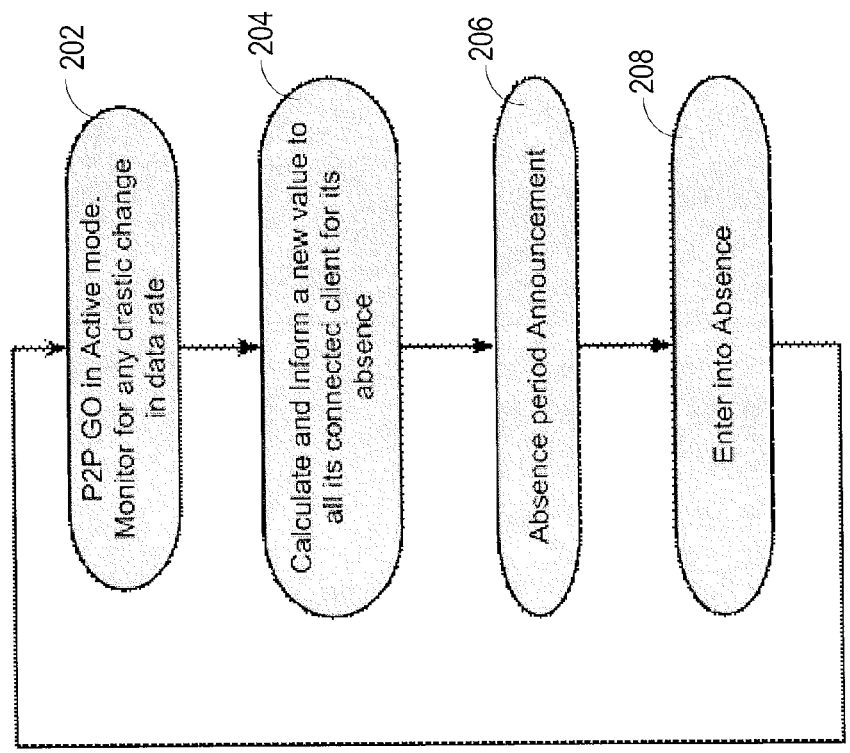
FIG. 2 is an example of a flow diagram for operation of a wireless communication device in the local communication network of FIG. 1.

FIG. 2 is an example of a flow diagram for operation of a wireless communication device in the local communication network of FIG. 1. FIG. 2 illustrates an embodiment of a method and system for balancing power consumption and data throughput in a wireless communication device such as the group owner 102 of FIG. 1. The exemplary apparatus and method enable saving power by a peer-to-peer group owner by use of an adaptive period of absence in its hardware and firmware implementation. The group owner can adapt its decision to determine the periodic absence of the group owner without affecting the overall data throughput bandwidth and thus saving substantial power for mobile devices which are to be connected on a peer-to-peer network such as the network 100 of FIG. 1.

The steps of FIG. 2 may be performed in any wireless communication device in a network entering an absence period. In one exemplary embodiment, the steps are performed by a group owner of a peer-to-peer (P2P) WiFi Direct network which has one or more client devices in the network with the group owner. The steps of FIG. 2 form an operational loop that may be performed by the group owner or other device. In other embodiments, additional steps may be included other than the looping steps illustrated in the example of FIG. 2. The illustration of FIG. 2 is intended to be exemplary only.

At block 202, the group owner (GO) of the peer-to-peer network is in active mode. In active mode, the group owner is operating conventionally, ready to transmit and receive radio signals and other data. In one exemplary embodiment, radio circuits such as the WiFi radio circuit 114 of FIG. 1 are active and other portions of the group owner, such as the processor 110 are powered down to reduce power consumption in the active mode.

Also at block 202, the group owner monitors communication to detect any change in data rate. The group owner determines throughput data describing an amount of data communicated between the group owner and respective client devices in the local communication network. Based on the monitored throughput data, the group owner dynamically adjusts a period of absence inversely with the throughput data. In this manner, the group owner can balance power savings afforded by the period of absence with responsiveness to changes in data throughput.

The group owner can use any suitable techniques for measuring and monitoring data throughput. For example, in one embodiment, the group owner may count data packets received by the group owner from all client devices of the one or more client devices in the network. In another example, the group owner may count data packets transmitted from the group owner to all client devices in the network. Alternatively, one or more client device may be identified as having high throughput and the number of data packets sent to or received from the high-throughput client devices may be used as the measure of data throughput. In another example, the group owner may monitor the quantity of transmissions from the client devices, either individually or as a group, or as a subset of the entire group of client devices.

The group owner further determines if there is a change in the measured data amount or data rate. In one particular example, the group owner may determine quantities of data in any suitable manner, including those described above, and further compare the determined data quantities to one or more thresholds. For example, a single threshold may be used. If the number of data packets received during a predetermined time exceeds the threshold, the data rate is considered to be increasing and the absence period is adjusted downward accordingly. On the other hand, if the number of data packets received during the predetermined time falls below the threshold, the data rate is considered to be decreasing and the absence period is adjusted upward accordingly. Alternatively, a plurality of threshold values may be used so that a like plurality of durations of the period of absence may be selected.

One example of a predetermined time is a beacon interval, or the time duration between transmissions by the group owner of an informational beacon broadcast to all clients in the network. Any other suitable predetermined time may be used. Also, instead of a fixed time, a variable time period may be used for measuring data rate. For example, as the number of packets or volume of data begins to increase, the group owner may begin to use shorter predetermined times for monitoring data rate to provide a finer measurement and more accurate response to the increasing data rate. This may tend to make the balancing of power savings to data throughput more responsive in rapidly changing conditions.

At block 204, in response to a determined change in data rate, the group owner calculates a new period of absence (POA). The period of absence represents the time duration when the group owner will be in a low power mode and thus not present in the network to communicate with any client device. The period of absence may be defined by, for example, the start time and the time duration of the period of absence. The period of absence is related to the throughput data determined in block 202. The group owner may dynamically adjust the period of absence inversely with the throughput data. Alternatively, the group owner adaptively adjusts duration of the period of absence in response to quantity of transmissions from the client devices. The group owner uses the determined data quantity and adjusts the period of absence to balance power savings from a battery in the wireless communication device and data throughput from the wireless communication device to the one or more client devices on the peer-to-peer network.

In one particular example, the process illustrated by block 202 may be implemented in firmware in the group owner. One exemplary implementation is shown by the following pseudo code:

A variable packet_count is set to a value PKT_COUNT_TRIGGER_ADAPTIVE_NOA. This value represents the time between new calculation of the adaptive period of absence.

At every timed interval of PKT_COUNT_TRIGGER_ADAPTIVE_NOA, an adaptive algorithm in the firmware may determine the period of absence, which will get translated to 5 threshold limits.

```
if(rx_packets++ % packet_count == 0) {
    if(current_time < stored_jiffies) {
        //take care of wrap around
    } else {
        //do time based calculations;
    }
    if(time_taken <= THRESHOLD_SUPER_LOW) {
        Turn off Period of Absence. No power save [0%], Max throughput.
    else if (time_taken > THRESHOLD_SUPER_LOW &&
TIME_TAKEN <= THRESHOLD_LOW) {
        Adapt to a low no. for period of absence [20%]. Low power save, high throughput.
    }
    else if (time_taken > THRESHOLD_LOW && time_taken <= THRESHOLD_MEDIUM) {
        Adapt to a medium no. for period of absence (40%). Medium power save, medium traffic.
    }
    else if (time_taken > THRESHOLD_MEDIUM && time_taken <= THREHSOLD_HIGH) {
        Adapt to a high no. for period of absence (60%). High power save, low traffic.
    }
    else if (time_taken > THRESHOLD_HIGH)
        Adapt to a highest no. for period of absence (80%). Very high power save, very low traffic.
    }
    stored_jiffies = current_time
}
```

Thus, in this example, four threshold values are set up corresponding to super-low, low, medium and high data rate. The determined data rate or throughput data is compared with these four thresholds. Four periods of absence are set up as respective percentages of the maximum period of absence time. In this example, the possible periods of absence correspond respectively to 0 percent, 20 percent, 40 percent and 80 percent of the maximum. At 80 percent, a maximum power save selection is made when low traffic is detected. At 0 percent, a maximum data throughput selection is made with no power saving. Such a selection might be made, for example, when the network is streaming data such as a video file or audio file. In this manner, the power savings at the group owner of the communication network is adapted to the throughput of data with an inverse relationship between power savings and throughput.

At block 206, the group owner broadcasts information about the period of absence. In one example, the group owner may transmit beacon frames for reception by the client devices in the network. The beacon frames include a notice of absence descriptor defining the period of absence. In one example, the beacon is broadcast at a set time and the beacon is formatted with data about duration and start time of the period of absence. Further information about one example of a beacon frame is given below in conjunction with FIG. 7.

At block 208, the group owner enters a low power mode for the period of absence. In the low power mode, unused components of the group owner are powered down to reduce power consumption from the battery providing operating power to the group owner. Some functions remain operational, such as a supervisory process to time the duration of the period of absence and to re-start the powered down components upon lapse of the period of absence.

In some embodiments, only the components necessary for radio communication on the network enter the low power mode as controlled by the process of FIG. 2. For example, referring to FIG. 1, the WiFi radio circuit 114 may operate on a low power cycle which is independent of a low power cycle of the broadband radio circuit 116. The broadband radio circuit 116 has timing which is independent of the timing of the WiFi radio circuit 114. For example, transmission and reception of beacons in the respective radio circuits 114, 116 will be asynchronous. Also, the broadband radio circuit is more likely a client device of a broadband base station or other server device in the broadband network, so the timing of operation of the broadband radio circuit 116 is subject to control of another device. Moreover, the control circuitry of the group owner 102, such as processor 110 and memory 112, may have an independently controlled sleep mode which is likewise asynchronous with the process of FIG. 2. Separating the low power modes of independent but interrelated portions of the group owner in this manner allows better tailoring of power savings to operational condition so as to maximize the life of the battery 122.

After block 208, control returns to block 202. For example, the group owner remains in the low power mode during the duration of the absence period. At block 202, the group owner exits the low power mode and begins to monitor for a change in the data rate or throughput in the local communication network. If no significant chance is detected, the group owner can return to the low power mode. The group owner, or the WiFi radio circuit 114, remains in the loop illustrated in FIG. 2 to continue to implement the illustrated method.

FIGS. 3 through 6 are examples of power consumption and data transfer in the local communication network of FIG. 1. The diagrams in these figures illustrate relative operation of a device such as a group owner of a peer-to-peer network such as a WiFi Direct network. Each of FIGS. 3 through 6 shows time on the horizontal axis marked by a sequence of beacon transmission times labeled TBTT (for target beacon transmission time). The sequence of beacon transmission times defines a sequence of beacon intervals. A group owner time scale 302 shows group owner (GO) absence time. A data communication time scale 304 shows times when data is transmitted in the network. A power consumption time scale 306 shows times when power consumption is relatively high or low. These time scales are exemplary only and are intended to show relative timing of events, rather than precise time relationships.

Figure 3:
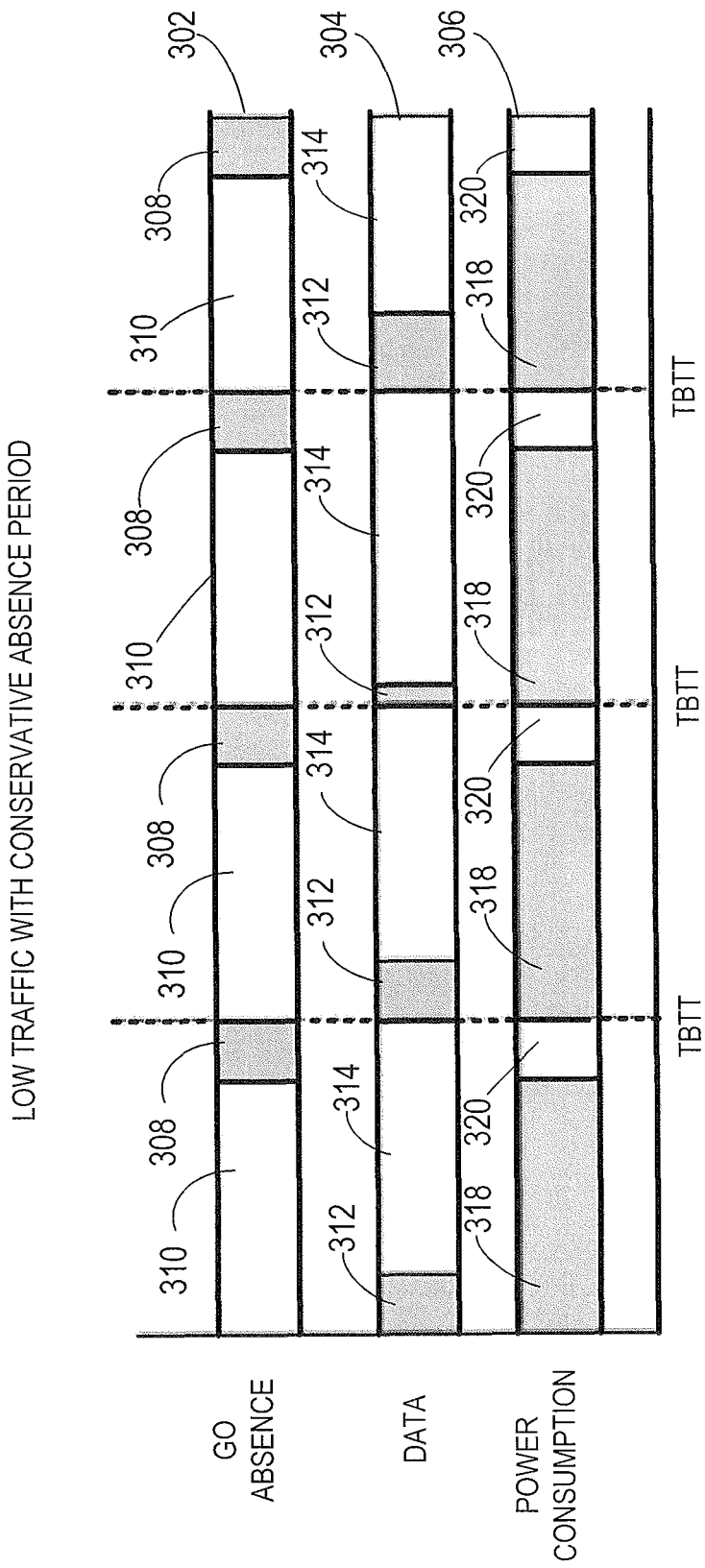
FIGS. 3 through 6 are examples of power consumption and data transfer in the local communication network of FIG. 1.

FIG. 3 illustrates a condition of relatively low traffic for data in the network with a relatively conservative absence period. In this example, a relatively conservative absence period corresponds to an absence period of shorter duration than the maximum to better ensure that the group owner can support the data traffic in the network. The group owner absence time scale 302 indicates absence periods 308 for the group owner during each beacon period, marked by a beacon transmission at a time TBTT and the subsequent time before the next beacon transmission time. The absence periods 308 are shaded in FIG. 3. Between the absence periods 308 are group owner active periods 310. In this example, the active periods immediately follow the beacon transmission times TBTT and have a substantially constant duration. This may be varied in other examples, though. During the active periods 310, the group owner is available to transmit or receive data in the network.

The data communication time scale 304 shows relative transmission times for data transmission in the network. In the example, data transmission times 312 are shaded and vary in duration during a beacon interval. Following each data transmission time 312 before the subsequent beacon transmission time TBTT is a data quiet time 314 when no data is transmitted.

The power consumption time scale 306 shows relative power consumption in the group owner. The power consumption times 318 represent times when power consumption in the group owner is relatively high because, for example, the WiFi radio circuit is powered. The reduced power times 320 are not shaded and represent times when the group owner is in a low power mode of operation. In general, the power consumption times 318 correspond in time with the active periods 310 of the group owner.

In FIG. 3 it can be seen that because of the relatively low traffic condition and the conservative absence period being used, the group owner is consuming more power than necessary. This example generally corresponds to the conventional situation in which a peer-to-peer group owner can specify a period absence time, such as absence time 308. One result is that power consumption, as shown by power consumption times 318, is excessive. Because of the light traffic shown by data transmission times 312, the group owner remains active longer than is necessary in each beacon interval. Power savings could be increased by increasing duration of the absence periods 308, or by adapting the duration of the absence periods 308 to data throughput in the network.

Figure 4:
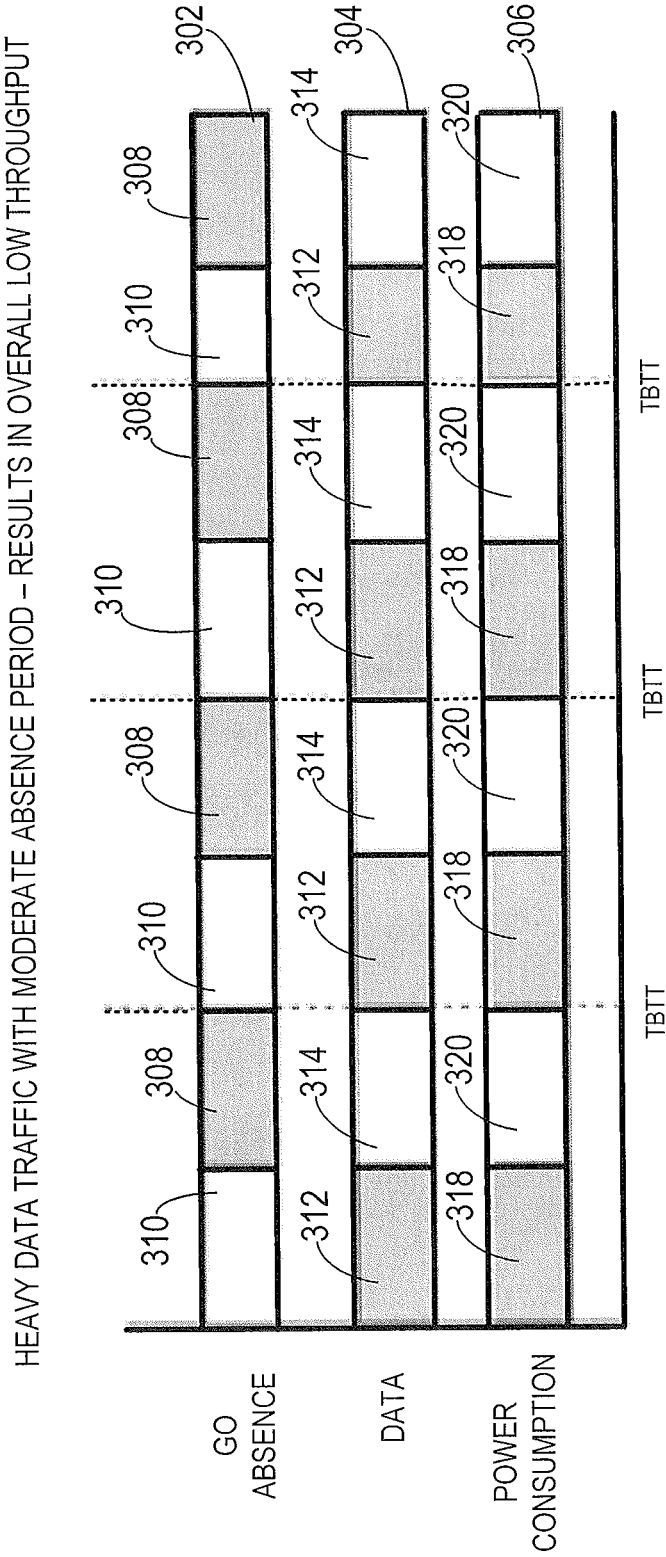

FIG. 4 shows similar time scales for a condition of relatively heavy traffic with moderate absence periods. This example in FIG. 4 is similar to the results available with the conventional definition of an absence period which is set to repeat periodically with the same time duration. Here, the absence periods 308 represent about one-half of each beacon interval. Active periods 310 represent the other half of the beacon interval, when the group owner is actually transmitting or receiving data.

As shown by the data transmission times 312, each data transmission time 312 matches a corresponding active period 310 of the group owner. So long as the group owner is active, data is being transmitted. Data transmission only stops, during data quiet times 314, when the group owner is in an absence period. Additional data could be transmitted if the active periods 310 could be extended in duration. In this example, data throughput is reduced because of the fixed absence period. Data throughput could be increased by adapting the absence periods 308 to the data throughput in the network. Power consumption, as shown by the power consumption times 318, is set at a moderate level.

Figure 5:
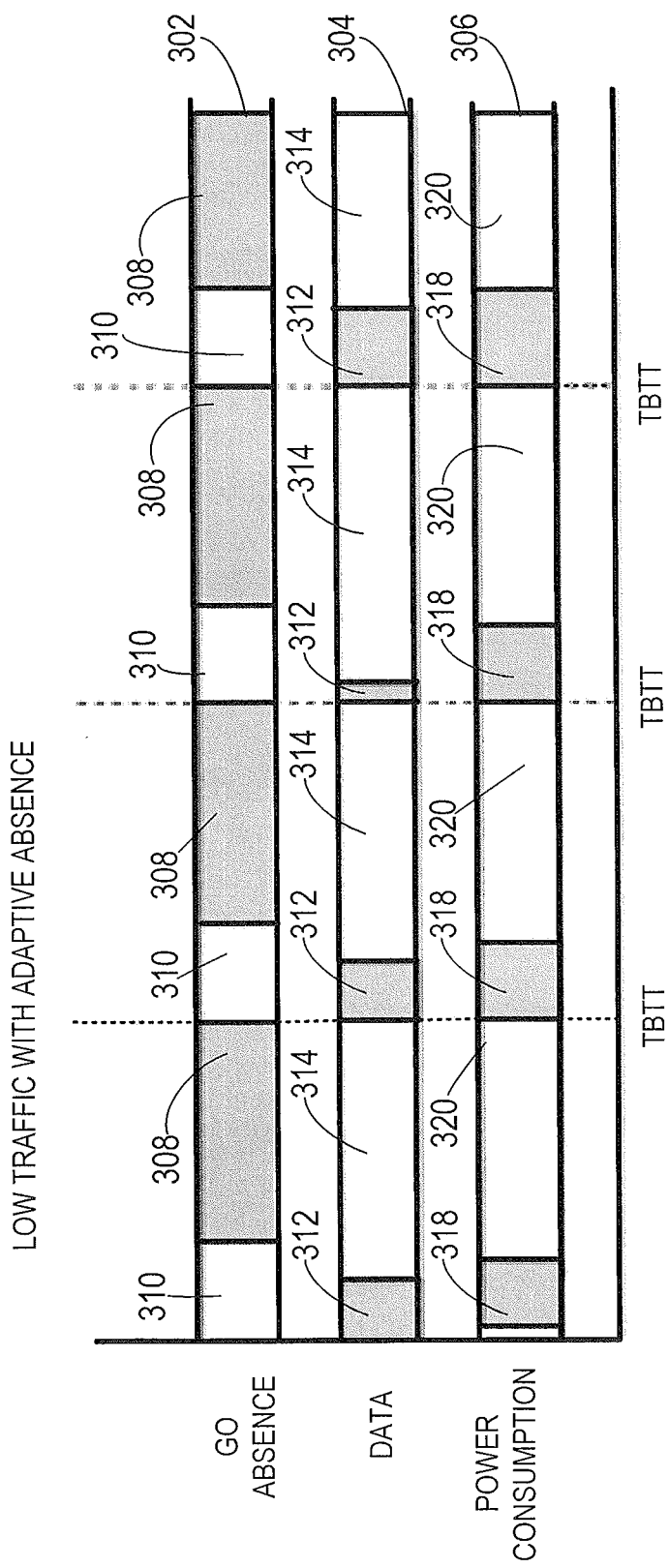
Figure 6:
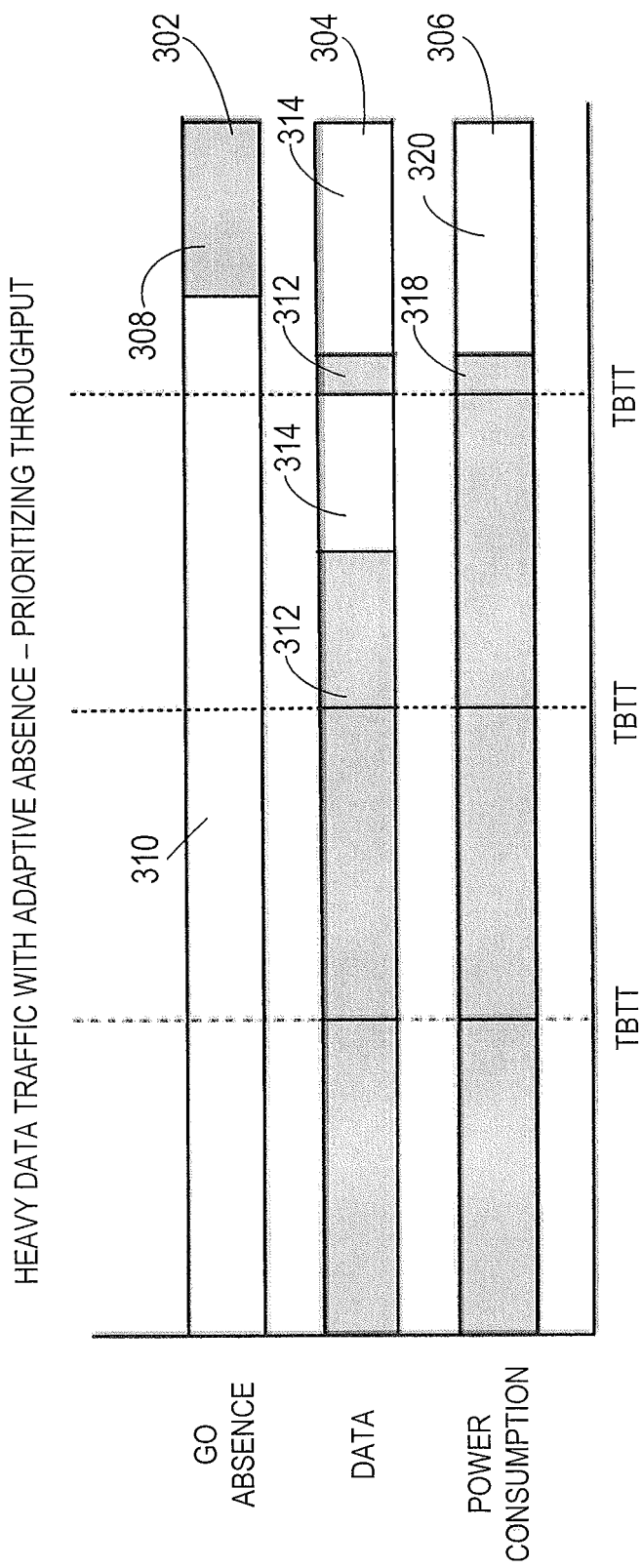

FIG. 5 shows similar time scales for a condition of relatively light traffic with adaptive absence periods 308. The data transmission times in FIG. 5 generally match those in the example of FIG. 3. In FIG. 5, the data transmission times 312 vary in duration for each beacon interval. The absence periods 308 are set so as to provide an active period 310 of sufficient duration to communicate all currently available data in the data transmission time 312. After all available data is communicated, the absence period 308 is begun and data may be saved for the start of the next beacon interval and the next active period 310. The duration of the absence periods has been adapted to the amount of data in the network at the given time. A clear benefit is that the power consumption times 318 are reduced in duration, particularly when compared to the power consumption times 318 shown in the example of FIG. 3 for communication of similar amounts of data. By adapting the absence period to data throughput, power consumption has been reduced and power savings has been increased.

Figure 7:
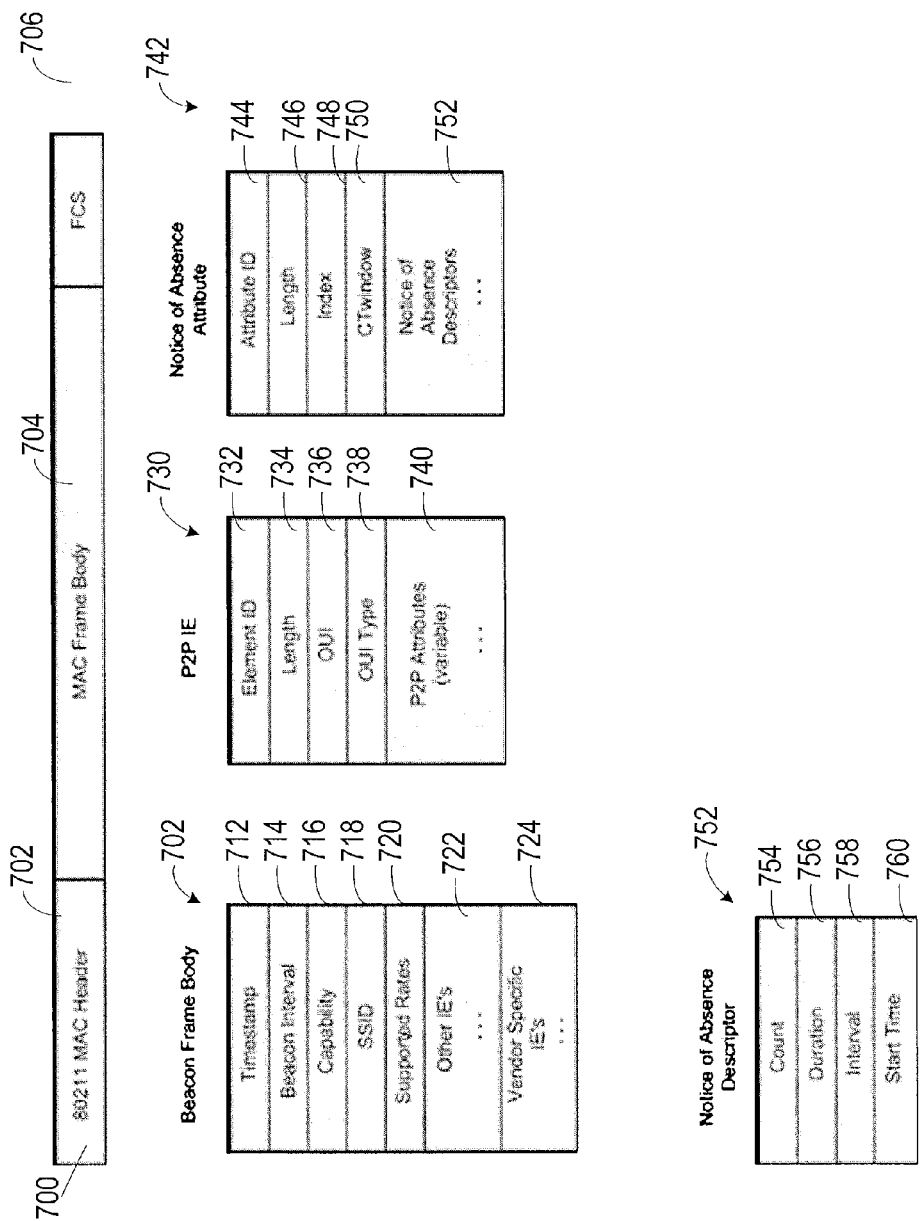
FIG. 7 is an example of beacon format for use in the local communication network of FIG. 1.

FIG. 7 shows similar time scales for a condition of heavy data traffic in which data throughput is prioritized over power savings. In this example, the first data transmission time 312 is of long duration, exceeding two beacon intervals in duration. The system and method described herein respond by adapting the absence period accordingly. In this example, the absence period is changed to zero percent absence so that a continuous active period 310 is employed to transmit data. Following the end of the first data transmission period 312, a data quiet time 314 occurs when there is no additional data to transmit during the current beacon interval. The system and method detects the reduced data throughput represented by the end of the data transmission period 312 and the data quiet time 314 and adapts the absence period 308 to a moderate amount, such as eighty percent of the beacon interval. The power consumption time 318 matches the active period 310 in duration.

Power consumption is relatively high in this example, but the data is communicated rapidly with little or no latency. Under different circumstances or in a different use case, the absence period may be adapted to a more power-conservative value at the cost of reduced throughput. By inserting absence periods 308 in each beacon interval, power consumption would be reduced. Adaptive use of absence periods in this manner permits the power consumption and data throughput to be balanced and tailored to current needs or system design goals. Moreover, this tailoring can be done dynamically, for example as data traffic levels change and as battery state of charge changes. When substantial data is to be communicated, such as when a video file is being streamed to a client device by the group owner, the absence periods can be shortened or eliminated to provide the highest throughput and little or no latency. On the other hand, if battery state of charge is low and power must be conserved, the system and method can select longer absence periods to save battery power, at the expense of longer latency for the data.

FIG. 7 is an example of a format for a beacon frame 700 for use in the local communication network 100 of FIG. 1. The beacon frame 700 may be transmitted at predetermined times by a group owner of a network such as a WiFi Direct network, in one example, to announce the presence of the network and its capabilities. In this exemplary embodiment, the beacon 700 includes a header 702, a frame body 704 and a frame check sequence (FCS) 706. In a conventional WiFi network, a beacon frame is periodically transmitted by the access point which controls the WiFi network to inform other devices on the network. The beacon frame 700 extends the WiFi beacon frame to use in a network with an adaptive absence period as described herein. Client devices in the network receive and decode the beacon frame 700 to obtain information about network operation, including absence periods of the group owner.

The header 702 may be a conventional WiFi header in accordance with the IEEE 802.11 standard. In that regard, the header 702 includes source and destination media access control (MAC) addresses as well as other information regarding radio communication in the network.

The frame body 704 includes several components or data fields, as shown in the exemplary embodiment of FIG. 7. In this example, the frame body 704 includes a timestamp 712, a beacon interval 714, capability information 716, a service set identifier (SSID) 718, supported rates 720, other information elements 720 and vendor specific information elements 722. Other components, or fewer components may be used as well.

The timestamp 712 conveys timing information of the group owner to client devices that receive the beacon frame 702. After receiving a beacon frame 700, a client device uses the data contained in the timestamp 712 to update its local clock. This process enables synchronization among all client devices that are associated with the same group owner which transmits the beacon frame 700.

The beacon interval 714 represents the amount of time between beacon transmissions. The beacon interval 714 is used by the group owner and client devices when one of them enters power save mode. The device needs the beacon interval 714 to know when to wake up to receive a subsequent beacon frame 700.

The capability information 716 identifies requirements of stations that wish to belong to the wireless LAN that the beacon represents. The Service Set Identifier (SSID) 718 identifies the specific wireless local area network (WLAN) under control of the group owner. Before associating with a particular WLAN, a client device must have the same SSID as the group owner. The group owner includes the SSID 718 in the beacon frame 700 to enable client devices seeking to join the WLAN to identify the SSID and automatically configure the WiFi radio circuit of the client device with the proper SSID 718.

The supported rates 720 include information that describes the data transmission rates that the particular WLAN supports. For example, the supported rates field 720 of the beacon frame 700 may indicate that only 1, 2, and 5.5 Mbps data rates are available. The other information elements 722 and the vendor specific information elements 724 include other information that may be specified for broadcast on the beacon frame 700 to all client devices of the network.

Examples of the other information elements 722 that may be defined for the beacon frame include peer-to-peer information elements 730. These P2P information elements 730 include, in one example, an element identifier 732, a length 734, an organizational unique identifier (OUI) 736, and OUI type 738 and P2P attributes 740. The element identifier 732, the length, the OUI 734 and the OUI type may be as used conventionally in other 802.11 devices.

The P2P attributes 738 may include notice of absence attributes 742. The notice of absence attributes 742 are broadcast on the beacon frame 700 by a group owner prior to entry into an absence period. The notice of absence attributes 742 defines aspects of the absence period. The notice of absence attributes 742 include in this example an attribute identifier 744, a length 746, an index 748, a CT window 750 and notice of absence descriptors 752. The attribute identifier 744, a length 746, an index 748, a CT window 750 all may have conventional values and usages as defined by the WiFi Direct specification. The notice of absence descriptors 752 define the notice of absence period being initiated by the group owner. The notices of absence descriptors 752 include a count 754, a duration 756, an interval 758 and a start time 760.

The group owner broadcasts the beacon frame 700 for reception by all client devices in the network. The client devices receive the beacon frame 700 and parse its contents to learn the attributes of the notice of absence. Based on this information, the client devices continue communicating with the group owner until onset of the period of absence, suspend communication during the period of absence, and resume communication following the period of absence. The group owner may adapt the duration of the period of absence according to the current throughput needs it determines and, using the beacon frame 700, advise the client devices of the new absence frame descriptors. The client devices can adapt their performance accordingly.

Figure 8:
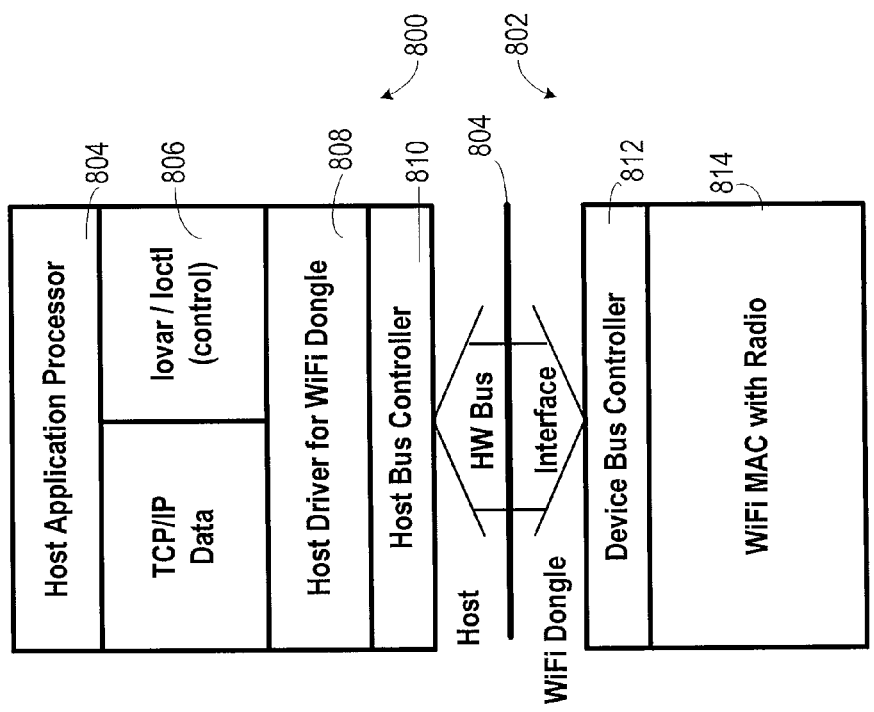
FIG. 8 is a partial block diagram of a group owner device operational in the local communication network of FIG. 1.

FIG. 8 is a partial block diagram of a group owner device or host 800 operational in the local communication network 100 of FIG. 1. FIG. 8 shows interconnection between the host 800 and a dongle 802. The host 800 and the dongle share communication on a bus 804. The host 802 includes a host application processor 806, a TCP/IP and input-output control layer 806 and a host driver for the WIFi dongle 808 and a host bus controller 810. The dongle 802 includes a processor 814 that implements a WiFi media access control layer and a bus controller 812.

In one embodiment, the host 800 controls non-local network activity and the dongle 802 controls all local network activity. Local network activity includes radio communication with all local radio devices on local networks. Local networks include WiFi, WiMAX and Bluetooth and other networks. Local radio devices include laptops, mobile devices including mobile telephones, printers and other networkable equipment having radio communication capability. Radio communication includes network negotiation and setup, synchronization, on-going communication, prioritization and network tear-down. For the host 800, non-local activity includes data processing, user interface control and response and communication with non-local networks such as a broadband network like a cellular network.

The dongle 802 may be a dedicated component of the group owner or host 800. In one example embodiment, the dongle 802 is contained in a single integrated circuit which is separate from the integrated circuits that form the host 800. In another example, the dongle 802 may be a module within an integrated circuit of the host, or the dongle 802 may be incorporated in two or more integrated circuits with data communication access to the host 800. The illustration of FIG. 8 is intended to be illustrative of one hypothetical arrangement only, and not limiting in any way.

By separating physical form and function in this manner, local network communications are offloaded to the dongle 802 by the host 800. Communication between the two devices is over the bus 804. The dongle 802 is free to manage all local network communications according to the data throughput requirements and availability of other network devices. The host 800 thus has only minimal involvement in such local network communications. Local communications are in effect buffered by the dongle 802. The host 800 may enter a low power sleep mode while the dongle 802 is busy handling network communications. For example, if the dongle 802 is receiving data over a WiFi Direct link from a client device, the dongle 802 can buffer some number of frames of data. When the dongle 802 buffer is full, the dongle can alert the host 800 over the bus 804 and transfer the data to the host 804 for further processing. Further processing may include communicating the data using a broadband radio circuit of the host to a broadband network.

Thus, in one exemplary embodiment, at a dedicated component such as the dongle 802 of a host 800 acting as a group owner in a local communication network the dongle 802, the dongle 802 monitors data throughput in the network. As data throughput changes, the dongle 802 dynamically adjusts the period of absence inversely with the throughput data. The dongle or other dedicated hardware component enters a low power mode for a time duration set by the dynamically adjusted period of absence. When the time duration elapses, the dongle 802 exits the low power mode. The dongle 802 then communicates data with respective client devices and alerts the host 800 of the group owner to exit a host low power mode based on the communicated data. The host 800 and dongle 802 then can communicate data.

From the foregoing, it can be seen that the present embodiments provide method and system for saving power by a battery-powered peer-to-peer group owner acting as an access point in an ad hoc network. The group owner can define an absence period during which it can enter a low power mode and client devices in the network must suspend communication with the group owner. The absence period is now defined dynamically. The group owner monitors data throughput in the network and adjusts the absence period according to the data traffic. The group owner dynamically adjusts the period of absence inversely with the throughput data. During quiet periods of little data, the absence period is extended, improving power savings from the battery. During busy times, the absence period is shortened or even foregone to permit highest data throughput when needed, such as in response to streaming data. The group owner can tailor power savings and data throughput based on other conditions such as state of charge of the battery.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
   at a group owner of a peer-to-peer wireless network, communicating data with one or more respective client devices in the peer to peer wireless network;
   at the group owner, determining throughput data describing an amount of data communicated between the group owner and the respective client devices during a specified time period;
   at the group owner, determining a period of absence having a time duration which is related to the throughput data and dynamically adjustable by the group owner in response to variation in the throughput data;
   entering a lower power mode for a time duration set by the period of absence;
   comparing the throughput data with a plurality of threshold values; and
   selecting a period of absence time duration value from among a plurality of period of absence time duration values based at least in part on the comparison to adjust the time duration of the period of absence in response to variation in volume of data communicated.

2. The method of claim 1 further comprising:
   from time to time, updating the throughput data;
   based on the updated throughput data, determining an updated period of absence; and
   subsequently, entering the lower power mode for a time duration set by the updated period of absence.

3. The method of claim 1 further comprising:
   comparing the throughput data with respective threshold values; and
   based on the comparison, selecting a respective period of absence as a respective percentage of a maximum period of absence from among a plurality of respective percentages of the maximum period of absence; and
   subsequently, using the selected period of absence during communication with the one or more respective client devices.

4. The method of claim 1 further comprising:
   measuring respective throughput data amounts during respective specified time periods;
   varying specified time period durations during which the respective throughput data amounts are measured according to the amount of data communicated between the group owner and the respective client devices during respective specified time periods so that a shorter specified time period duration may be used during high data rate periods to provide finer measurements and more accurate response to increasing data rates.

5. The method of claim 1 wherein determining throughput data comprises:
counting data packets received by the group owner from all client devices of the one or more client devices.

6. The method of claim 1 wherein determining throughput data comprises:
determining a proportion of active communication time of the group owner.

7. The method of claim 1 further comprising:
at a dedicated hardware component of the group owner, dynamically adjusting the period of absence inversely with the throughput data;
at the dedicated hardware component, entering the low power mode for a time duration set by the dynamically adjusted period of absence;
exiting the low power mode at the dedicated hardware component;
at the dedicated hardware component, communicating data with respective client devices; and
alerting a host application processor of the group owner to exit a host low power mode based on the communicated data.

8. A device capable of wireless communication comprising:
a host including a host processor, the host processor configured to communicate broadband data with a broadband network; and
a wireless communication module operative to establish as a group owner a network with client devices and to communicate the broadband data with the client devices, the wireless communication module further operative to determine a quantity of transmissions of the broadband data from the client devices during a specified time period, the wireless communication module further operative to determine a period of absence from the network when the wireless communication module enters a lower power mode, the wireless communication module further operative to adaptively adjust duration of the period of absence in response to the determined quantity of transmissions from the client devices during the specified time period.

9. The device of claim 8 wherein the wireless communication module comprises:
a component which is physically detachable from the host, the component comprising:
a bus for data communication of data including the broadband data with a bus of the host;
a processor;
a memory storing code and data to control the processor; and
a radio circuit for radio communication of the data including the broadband data with the client devices.

10. The device of claim 9 wherein the wireless communication module implements a Wi Fi Direct media access control layer.

11. The device of claim 9 wherein the component comprises a dongle configured to buffer data communication of the broadband data with the client devices while the host processor enters a low power host mode, and wherein, upon receipt of sufficient data by the wireless communication module, the wireless communication module alerts the host processor to exit the low power host mode to receive the data from wireless communication module.

12. The device of claim 10 wherein the wireless communication module is operative to transmit beacon frames for reception by the client devices, the beacon frames including a notice of absence descriptor defining the period of absence.

13. The device of claim 12 wherein the processor is operative to periodically compare a number of data packets received from the client devices with one or more thresholds and, in response to the comparison, establish a new duration of the period of absence and to actuate the radio circuit to communicate one or more beacon frames informing the client devices of the new duration of the period of absence.

14. A method for a wireless communication device operating as an access point in a peer-to-peer network, the method comprising:
receiving at the wireless communication device data from one or more client devices on the peer-to-peer network;
after lapse of a time interval, determining quantity of the data received at the wireless communication device during the time interval;
using the determined data quantity of the data received during the time interval, adjusting a period of absence to balance power savings from a battery in the wireless communication device and data throughput from the wireless communication device to the one or more client devices on the peer-to-peer network;
communicating information about the adjusted period of absence to the client devices on the peer-to-peer network, including
broadcasting a beacon at a set time, including formatting the beacon with data about time duration and start time of the period of absence for use by the one or more client devices on the peer-to-peer network for synchronizing to the wireless communication device operating as the access point; and
periodically, re-broadcasting the beacon with updated data about time duration and start time of the adjusted period of absence;
at the start time of the period of absence, entering a low power mode for a time duration of the period of absence;
exiting the low power mode; and
receiving additional data from the one or more client devices on the peer to peer network.

15. The method of claim 14 further comprising:
based on the received additional data, updating the time duration of a future period of absence.

16. The method of claim 14 wherein adjusting comprises:
comparing the determined data quantities to one or more thresholds; and
setting the period of absence based on the comparison.

17. The method of claim 14 wherein adjusting comprises:
when the determined data quantity is increasing over time, reducing the period of absence; and
when the determined data quantity is decreasing over time, increasing the period of absence.

18. The method of claim 14 wherein adjusting comprises:
when data traffic between the wireless communication device is relatively heavy, suppressing the low power mode to emphasize data throughput on the peer-to-peer network; and
when data traffic to the wireless communication is relatively light, extending successive periods of absence to emphasize power savings in the wireless communication device.

19. The method of claim 14 further comprising:
when an amount of data at a WiFi module of the wireless communication device exceeds a threshold, communicating a wakeup signal from the WiFi module to a host processor of the wireless communication device;
at the host processor, exiting a low power mode;
at the host processor, receiving WiFi data from the WiFi module;
at the host processor, processing the WiFi data; and
at the host processor, communicating data including the WiFi data to a remote broadband network.

20. The method of claim 14 further comprising:
at the wireless communication device operating as an access point in the peer-to-peer network, communicating broadband data with a broadband network;
communicating the broadband data with a client device of the one or more client devices;
determining a broadband quantity of data or a broadband data rate of communication of the broadband data with the client device; and
adjusting the period of absence according to the broadband quantity of data or the broadband data rate.

* * * * *